(12) United States Patent
Shivak

(10) Patent No.: US 9,113,591 B2
(45) Date of Patent: Aug. 25, 2015

(54) IMPLEMENT FOR ADJUSTABLY METERING AN AGRICULTURAL FIELD INPUT ACCORDING TO DIFFERENT FRAME SECTIONS

(71) Applicant: Raven Industries, Inc., Sioux Falls, SD (US)

(72) Inventor: Stanislaus Montgomery Shivak, Stockholm (CA)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 13/776,285

(22) Filed: Feb. 25, 2013

(65) Prior Publication Data

US 2013/0333601 A1  Dec. 19, 2013

Related U.S. Application Data

(60) Provisional application No. 61/661,181, filed on Jun. 18, 2012.

(51) Int. Cl.
*A01C 23/04* (2006.01)
*B05B 1/16* (2006.01)
(Continued)

(52) U.S. Cl.
CPC . *A01C 7/04* (2013.01); *A01C 7/042* (2013.01); *A01C 7/102* (2013.01); *A01C 23/007* (2013.01);
(Continued)

(58) Field of Classification Search
CPC ............ A01B 76/00; A01C 7/00; A01C 7/08; A01C 7/10; A01C 15/00; A01C 19/00; A01C 23/00; A01C 23/04; A01C 23/02; A01C 23/023; A01C 23/025; A01C 23/047; A01C 7/04; A01C 7/042; A01C 7/102; B05B 1/00; B05B 1/14; B05B 1/16; B05B 3/18; B05B 9/00; B05B 9/03; B05B 9/04; B05B 9/06; B05B 12/00; B05B 12/02; B05B 12/04; B05B 12/06; B05B 12/08; B05B 15/04; B05B 1/20; B05B 3/00; B05B 9/035; B05B 9/0403; B05B 12/004; B05B 15/00; B05B 1/1681; B05B 1/169; B05B 9/0406; B05B 9/0423; G05D 11/00; G05D 11/003; G05D 7/00; G05D 7/0617; G05D 7/0629; G05D 7/0641; G05D 7/0664; G05D 7/0652; A01M 7/0042; A01M 7/0032; A01M 7/0025; A01M 7/00; A01M 7/005; A01M 7/0053; A01M 7/006; A01M 7/0082; A01M 7/0089
USPC ............ 111/118, 130; 239/63, 76, 155, 159, 239/170, 172, 176, 548, 550, 551, 566, 146, 239/147, 163, 164, 565, 562, 556, 557; 700/231, 240, 241, 242, 244, 282, 283, 700/284; 701/50
See application file for complete search history.

(56) References Cited

U.S. PATENT DOCUMENTS 5,337,959 A  8/1994 Boyd
5,635,911 A  6/1997 Landers et al.
(Continued)

FOREIGN PATENT DOCUMENTS

AU  725448  10/2000
(Continued)

OTHER PUBLICATIONS

"International Application Serial No. PCT/US2013/045445, International Search Report mailed Nov. 27, 2013", 3 pgs.
(Continued)

*Primary Examiner* — Christopher J Novosad
(74) *Attorney, Agent, or Firm* — Schwegman Lundberg & Woessner, P.A.

(57) ABSTRACT

Metering devices for an agricultural implement are provided for applying a field input, for example, pneumatically delivered granular product including seed or fertilizer or sprayed liquid product including fertilizer and the like, to an agricultural field. In the applying of the field input, the rate of application of the dispensers of one section of the implement can be collectively varied in relation to the rate of application of the dispensers of a different section of the implement frame.

34 Claims, 5 Drawing Sheets

(51) Int. Cl.
  *B05B 9/03* (2006.01)
  *B05B 12/04* (2006.01)
  *G05D 7/00* (2006.01)
  *G05D 11/00* (2006.01)
  *A01C 7/04* (2006.01)
  *A01C 23/00* (2006.01)
  *G05D 7/06* (2006.01)
  *B05B 9/04* (2006.01)
  *A01C 7/10* (2006.01)

(52) U.S. Cl.
  CPC .............. *A01C 23/042* (2013.01); *B05B 1/169* (2013.01); *B05B 1/1681* (2013.01); *B05B 9/0406* (2013.01); *B05B 9/0423* (2013.01); *G05D 7/0641* (2013.01); *G05D 7/0652* (2013.01); *G05D 7/0664* (2013.01); *G05D 11/003* (2013.01)

(56) References Cited

U.S. PATENT DOCUMENTS

| | | |
|---|---|---|
| 5,653,389 A | 8/1997 | Henderson et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood |
| 5,864,781 A | 1/1999 | White |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,936,234 A | 8/1999 | Thomas et al. |
| 5,938,071 A | 8/1999 | Sauder |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,093,926 A | 7/2000 | Mertins et al. |
| 6,122,581 A | 9/2000 | McQuinn |
| 6,145,455 A | 11/2000 | Gust et al. |
| 6,189,807 B1 | 2/2001 | Miller et al. |
| 6,199,000 B1 | 3/2001 | Keller et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,285,938 B1 | 9/2001 | Lang et al. |
| 6,373,057 B1 | 4/2002 | Penfold |
| 6,522,948 B1 | 2/2003 | Benneweis |
| 6,584,920 B1 | 7/2003 | Cresswell |
| 6,606,542 B2 | 8/2003 | Hauwiller et al. |
| 6,661,514 B1 | 12/2003 | Tevs et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,851,377 B2 | 2/2005 | Mayerle et al. |
| 6,877,675 B2 | 4/2005 | Benneweis |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,311,004 B2 | 12/2007 | Giles |
| 7,395,769 B2 | 7/2008 | Jensen |
| 7,472,660 B2 | 1/2009 | Mariman et al. |
| 7,478,603 B2 | 1/2009 | Riewerts et al. |
| 7,502,665 B2 | 3/2009 | Giles et al. |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,634,993 B2 | 1/2014 | McClure |
| 8,635,963 B2 | 1/2014 | Friggstad |
| 8,733,257 B2 | 5/2014 | Beaujpt et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,868,300 B2 | 10/2014 | Kocer et al. |
| 8,915,200 B2 | 12/2014 | Barsi et al. |
| 2002/0107609 A1 | 8/2002 | Benneweis |
| 2003/0070597 A1 | 4/2003 | Cresswell |
| 2005/0000277 A1 | 1/2005 | Giles |
| 2005/0076818 A1 | 4/2005 | Grimm |
| 2006/0086295 A1 | 4/2006 | Jensen |
| 2006/0265106 A1 | 11/2006 | Giles et al. |
| 2006/0273189 A1 | 12/2006 | Grimm et al. |
| 2007/0039880 A1 | 2/2007 | Mayerle |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2009/0078178 A1 | 3/2009 | Beaujot |
| 2009/0101371 A1 | 4/2009 | Melanson et al. |
| 2009/0271136 A1 | 10/2009 | Beaujot et al. |
| 2010/0032492 A1 | 2/2010 | Grimm et al. |
| 2010/0101469 A1 | 4/2010 | Landphair et al. |
| 2010/0132600 A1 | 6/2010 | Dean et al. |
| 2011/0054743 A1 | 3/2011 | Kocer et al. |
| 2011/0179984 A1 | 7/2011 | Beaujot et al. |
| 2011/0210186 A1 | 9/2011 | Kugler et al. |
| 2012/0169495 A1 | 7/2012 | Kowalchuk |
| 2012/0174843 A1 | 7/2012 | Friggstad |
| 2012/0195496 A1 | 8/2012 | Zaman |
| 2012/0211508 A1 | 8/2012 | Barsi et al. |
| 2012/0228395 A1 | 9/2012 | Needham |
| 2012/0271467 A1 | 10/2012 | Grimm et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2014/0048002 A1 | 2/2014 | Grimm et al. |
| 2014/0216315 A1 | 8/2014 | Beaujot et al. |
| 2014/0299673 A1 | 10/2014 | Grimm et al. |
| 2014/0312141 A1 | 10/2014 | Ravishankar |

FOREIGN PATENT DOCUMENTS

| | | |
|---|---|---|
| AU | 2004219715 | 9/2004 |
| AU | 2005247004 | 12/2006 |
| AU | 2006202376 | 12/2006 |
| AU | 2009203181 | 2/2010 |
| AU | 2012201357 | 9/2012 |
| AU | 2013203361 | 10/2013 |
| AU | 2013204455 | 3/2014 |
| AU | 2013248190 | 5/2014 |
| CA | 2229852 A1 | 8/1998 |

(56) References Cited

FOREIGN PATENT DOCUMENTS

| | | |
|---|---|---|
| CA | 2517031 A1 | 9/2004 |
| CA | 2528708 A1 | 11/2006 |
| CA | 2549300 A1 | 12/2006 |
| CA | 2674527 | 2/2010 |
| CA | 2770013 | 9/2012 |
| CA | 2811726 | 10/2013 |
| CA | 2813949 A1 | 2/2014 |
| CA | 2830306 | 4/2014 |
| CN | 202255911 U | 5/2012 |
| CN | 203264929 U | 11/2013 |
| DE | 102011053182 | 3/2013 |
| EP | 969712 | 1/2000 |
| EP | 0963255 B1 | 10/2002 |
| EP | 0847307 B2 | 1/2003 |
| EP | 1426112 B1 | 6/2011 |
| GB | 2322573 A | 9/1998 |
| JP | 2759711 B2 | 5/1998 |
| JP | 2005161221 A | 6/2005 |
| WO | WO-9837751 | 9/1998 |
| WO | WO-2004023865 | 3/2004 |
| WO | WO-2004081499 | 9/2004 |
| WO | WO-2008112930 A1 | 9/2008 |
| WO | WO-2010105221 A1 | 9/2010 |
| WO | WO-2012022903 A1 | 2/2012 |
| WO | WO-2013191990 A2 | 12/2013 |
| WO | WO-2013191990 A3 | 12/2013 |

OTHER PUBLICATIONS

"International Application Serial No. PCT/US2013/045445, Written Opinion mailed Nov. 27, 2013", 9 pgs.

"International Application U.S. Appl. No. PCT/US2013/045445, International Preliminary Report on Patentability mailed Dec. 31, 2014", 7 pgs.

IMPLEMENT FOR ADJUSTABLY METERING AN AGRICULTURAL FIELD INPUT ACCORDING TO DIFFERENT FRAME SECTIONS

RELATED APPLICATIONS

This patent application claims the benefit of priority, under 35 U.S.C. §119(e), to U.S. Provisional Patent Application Ser. No. 61/661,181, filed on Jun. 18, 2012, which is incorporated herein by reference in its entirety.

FIELD OF THE INVENTION

The present invention relates to metering devices for an agricultural implement for applying a field input, for example pneumatically delivered granular product including seed or fertilizer or sprayed liquid product including fertilizer and the like, to an agricultural field in which the rate of application of the dispensers of one section of the implement can be collectively varied in relation to the rate of application of the dispensers of a different section of the implement frame.

BACKGROUND

When supplying an input product to an agricultural field, for example seed or fertilizer with air seeding implements, or various liquid products with an agricultural sprayer, the input product is typically applied evenly across a width of the frame of the implement. The usual distribution pattern of an implement across an agricultural field is to pass along the field in longitudinal rows with the rows being connected to one another by 180° curved sections joining the ends of adjacent ones of the rows. At the outside of the curve however the implement passes much more ground than the inner portion of the curved section such that when the product is evenly dispersed across the width of the frame, the product is applied to the field at a rate which is too dense at the inside of the curved section and too sparse at the outside of the curved section.

SUMMARY OF THE INVENTION

According to one aspect of the invention there is provided an implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a product supply arranged to store the input product therein so as to be supported for movement across the field together with the frame;

a plurality of conveying lines communicating between the product supply and respective ones of the product dispensers;

a plurality of metering devices in which each metering device is associated with one of the designated frame sections and communicates with at least one main line in communication with the respective conveying lines of the product dispensers associated therewith;

the metering devices being arranged to meter the input product therethrough from the product supply to the respective conveying lines at an adjustable rate relative to one another.

By providing a separate metering device for each of a plurality of designated frame sections, the dispensing devices of one frame section can be operated at a different rate from the dispensing devices from a different frame section to compensating for different ground speeds at the inner end outer portions of a curved section.

Also when passing over an end row of a designated crop area which is less than the full width of the implement frame, the metering device supplying the dispensing devices of corresponding frame sections aligned outside of the crop boundary can be shut off to limit waste and further increase efficiency of input product application.

The variable metering can be accomplished by various means. In a seeding implement, metering can be accomplished by providing main pneumatic conveying lines which communicate with the seed tanks by their own respective metering devices or by providing separate tanks in which each tank includes its own respective metering device for metering product into pneumatic conveying lines associated with only one frame section of the overall frame. In each instance the metering devices are operable in response to various speed inputs which are measured or calculated using various means.

Alternatively in the instance of a sprayer, metering of the fluid to a centre frame section, a left frame section, and a right frame section can be controlled independently by using separate pumps for the left and right sections relative to the centre section, or by using pressure reducing or throttling type valves to supply one section relative to other sections which allow one section of individual spray nozzles to be adjusted independently of the spray nozzles of another section.

In yet further arrangements of agricultural sprayers, a common rate of carrier fluid can be sprayed from all nozzles; however, metering devices are used for metering the chemical concentration of various input products into the main conveying line supplying one section of the frame relative to the main conveying line supplying a different section of the frame.

According to a second aspect of the present invention there is provided a sprayer implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a carrier fluid supply arranged to store a carrier fluid therein so as to be supported for movement across the field together with the frame;

a plurality of main lines in communication with the carrier fluid supply to receive carrier fluid therefrom in which each main line is only associated with one of the designated frame sections;

a plurality of conveying lines, each communicating a respective one of the product dispensers to one of the main lines associated with the respective designated frame section to dispense carrier fluid from the main lines therethrough;

a primary product supply arranged to store a primary input product therein so as to be supported for movement across the field together with the frame;

a plurality of metering devices in which each metering device is associated with one of the designated frame sections and communicates with at least one main line associated with the designated frame section;

the metering devices being arranged to meter the primary input product therethrough at an adjustable rate from the primary product supply into carrier fluid in the respective conveying lines whereby a metered amount of the primary input product is dispensed from the product dispensers in each designated frame section independently of the other frame sections.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
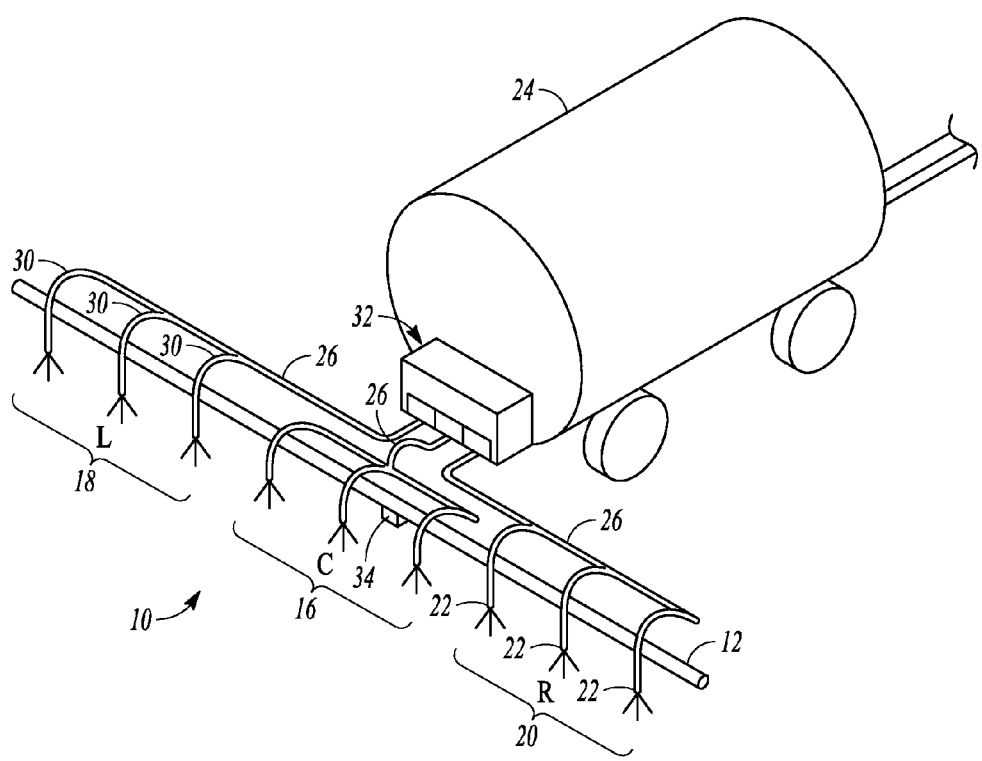
FIG. 1 is a schematic representation of one example of a sprayer implement to which the metering devices of the present invention can be applied.

Referring to the accompanying figures there is illustrated an agricultural implement for applying an input product, for example seed, granular fertilizer, liquid fertilizer and the like to an agricultural field. Although various embodiments are described and illustrated herein, the common features of the various embodiments will first be described.

In each instance, the agricultural implement 10 generally includes an implement frame 12 which is supported for movement across the ground in a forward working direction either by being supported on driven wheels or being towed by a tractor for example. The implement frame typically stands in a lateral direction perpendicular to the forward working direction and is separated into a plurality of designated frame sections 14. The frame sections may include one or more centre sections 16, one or more left wing sections 18 and one or more right wing sections 20.

In some instances, the center sections may be grouped with the winged sections such that the designated frame sections overall only comprise a left section and a right section. In each instance each frame sections extends laterally across a respective portion of the width of the frame so as not to overlap adjacent sections in the lateral direction and such that each designated frame section is positioned in series with the other frame sections in the lateral direction across the width.

A plurality of product dispensers 22 are supported on each frame section 14 such that the dispensers within each section are laterally spaced apart from one another and from the dispensers of adjacent sections. Each dispenser 22 is arranged to dispense respective product therethrough in a respective longitudinal row in the forward working direction. All of the dispensers of one designated frame section comprise a respective group of dispensers in which all of the dispensers of one group corresponding to one frame section are arranged to be commonly metered in rate relative to the rate of all dispensers of other groups in other frame sections.

The implement further includes an input product supply 24 typically in the form of a tank supporting the input product therein such that it is supported for movement across the field together with the implement frame 12 in the forward working direction. The tank may be supported on its own respective frame towed together with implement frame 12 or may be supported directly on the implement frame.

The input product is typically delivered from the product supply by a plurality of main lines 26 in communication with the supply which convey the product from the supply towards the designated frame sections. One or more main lines may be associated with each frame section for directing the product from the supply to one or more manifolds associated with the respective frame sections. The manifolds in turn redirect the supplied input product into a plurality of individual conveying lines 30 in which each conveying line is associated with only one respective product dispenser.

A plurality of metering devices 32 are supported with the input product supply 24 to meter the product from the supply into the main lines and the corresponding individual conveying lines to the product dispensers. One metering device 32 is associated with each designated frame section of the implement frame such that all of the product dispensers 22 of one respective frame section are commonly metered together by the respective metering device typically in communication between the product supply 24 and the main lines 26 upstream of the manifolds 28 and the individual conveying lines 30.

Figure 11:
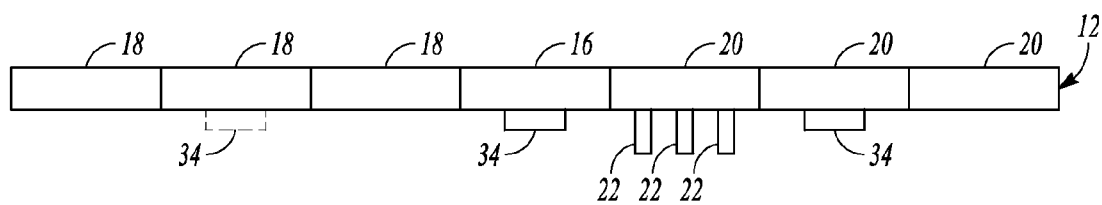
FIG. 11 is a schematic representation of an implement according to the present invention which is separated into a plurality of designated frame sections and which calculates a speed input for each designated frame section based on respective speed sensors.

Each metering device 32 is operable at a rate independently of the other metering devices in response to a respective speed input corresponding to the ground speed of the respective frame section with which the metering device is associated. The speed input is determined for each metering device either by providing a speed sensor 34 on each frame section for directly measuring the speed input for each metering device, or alternatively the speed input for each metering device can be calculated based on various measured inputs. For example, as shown in FIG. 11, one speed sensor may be centrally located to measure the average forward speed of the implement frame with at least one other speed sensor being provided at a laterally spaced location associated with one side section to determine if one side section is moving faster or slower than the central or average ground speed of the implement frame. This comparison permits corresponding calculation of the ground speed of the other side of the frame.

Speed calculation may be performed mechanically using a ground engaging wheel with a wheel rotation counter, by radar, or by GPS for example with the measured data being input into a computer controller which then calculates the appropriate speed input for each metering device representing an average forward ground speed of the respective designated frame section with which the metering device is associated and a corresponding metering rate.

Turning now to the embodiments of FIGS. 1 through 6, the implement frame in this instance comprises an agricultural sprayer such that the frame comprises a boom supported on a rolling vehicle chassis which also supports the input product supply 24 thereon in the form of a liquid tank. The overall metering system in this instance typically includes one pump 36 supplying an overall flow rate of product to the main lines as measured by a downstream flow rate sensor 38. The conveying lines in this instance comprise pressure fluid conveying lines while the product dispensers comprise nozzles which are spaced apart on the boom from which the product can be sprayed downwardly onto the ground. The frame sections typically comprise one center section 16 or one or more left wing sections with a corresponding number of right wing sections. The centre section is operated at an average rate which is determined by the average forward ground speed and which is the basis for the operation of a primary pump 36 when there is only one primary pump.

Figure 2:
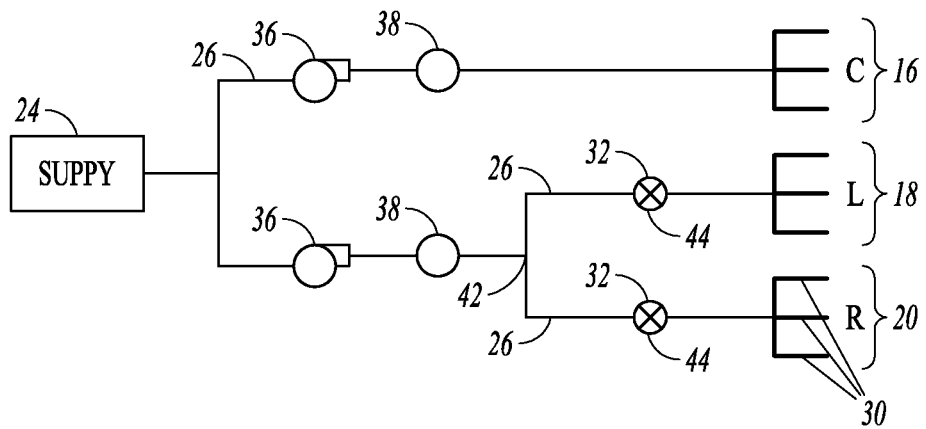
FIGS. 2 through 6 each schematically illustrate one respective embodiment of the metering system of the present invention applied to an agricultural sprayer.

Turning now more particularly to the embodiment of FIG. 2, in this instance two pumps are provided and each is arranged to be operated at a designated flow rate by adjusting the operating rate based on deviation of the flow rate measured by downstream flow rate sensors 38 from respective set point flow rates. The set point rates are the desired operating rates based on the calculated or measured speed input.

In the embodiment of FIG. 2 the main line to the center section is isolated from the other lines and is supplied with its own respective one of the pumps 40 with a flow rate sensor. The center pump 40 functions as the metering system for the main line of the center frame section. A branched line upstream from the center pump 40 communicates with the primary pump 36 supplying all other sections such that the combined flow rate of the centre pump and the primary pump 36 correspond to the overall desired flow rate for all sections during normal operation.

A primary manifold 42 downstream from the primary pump 36 splits the flow into a plurality of main lines associated with the plurality of side sections respectively. The metering device 32 of each side section in this instance comprises a suitable valve 44 connected in series with the mainline. The valve may comprise a throttling valve or a pressure reducing valve for example which is operable in response to a measured downstream flow rate sensor so that the flow in one side section can be adjusted relative to another side section while maintaining the overall flow rate consistent and while maintaining the flow rate in center section isolated from the adjusted flow rate of the side sections. Each valve 44 could also comprise a three way valve which allows some flow to be diverted from one side section to another side section.

Figure 3:
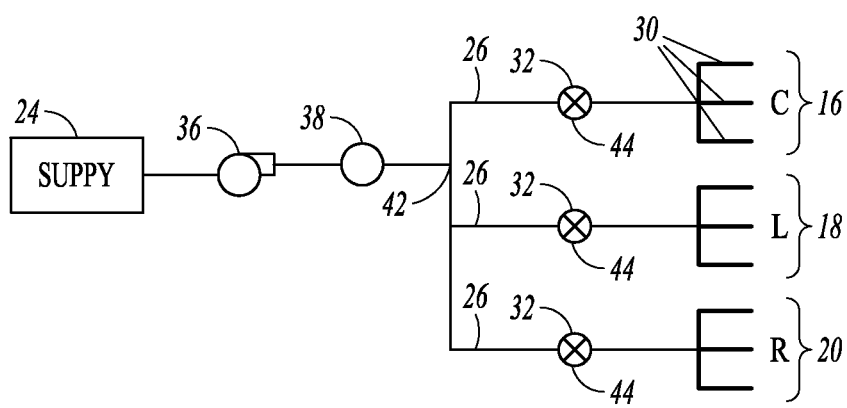

In the embodiment of FIG. 3 the primary pump 36 supplies the overall flow rate upstream from any of the metering devices to supply a primary manifold 42 which separates the line from the primary pump 36 into the individual main lines 26 which in turn supply the respective designed sections of the frame. Each main line in this instance is provided with its own pressure reducing valve 44 which is typically operated by pulse width modulation to maintain flow rate therethrough at a set point rate. The valve is operated to return the rate through the line to the set point rate whenever a downstream flow rate sensor detects that the actual measured rate deviates from the set point rate.

Figure 5:
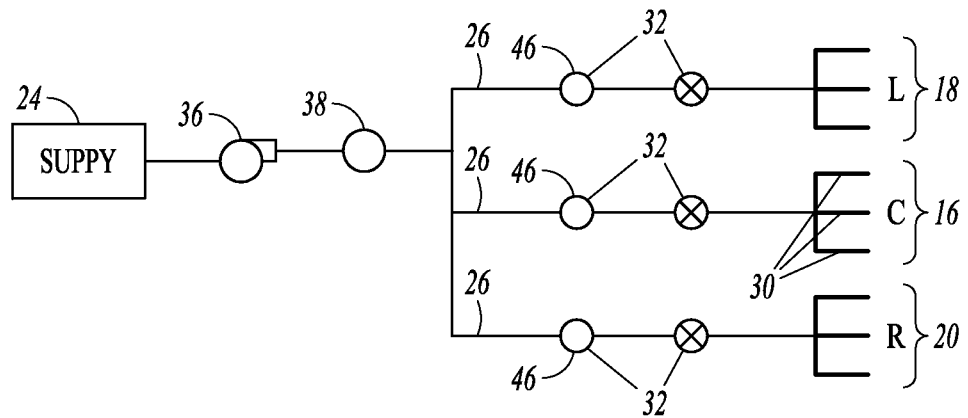

The embodiment of FIG. 5 is similar to the embodiment of FIG. 3 in that the primary pump provides a controlled flow rate to a primary manifold 42, however in this instance each of the main lines downstream from the primary manifold pass through a restricted orifice 46 defining part of the metering system of the main lines. The restricted orifices 46 step the pressure down before respective throttling valves 44 downstream from the orifices. The valves 44 define the metering devices in this instance. The throttling valves may be all operated in a partially restricted manner during normal operation with balanced flow such that one side section can be less restricted and another side section more restricted corresponding to outside and inside sections of a curved path for example to vary the flow between sections while maintaining the center section mainline substantially isolated and metered at a constant rate.

Figure 4:
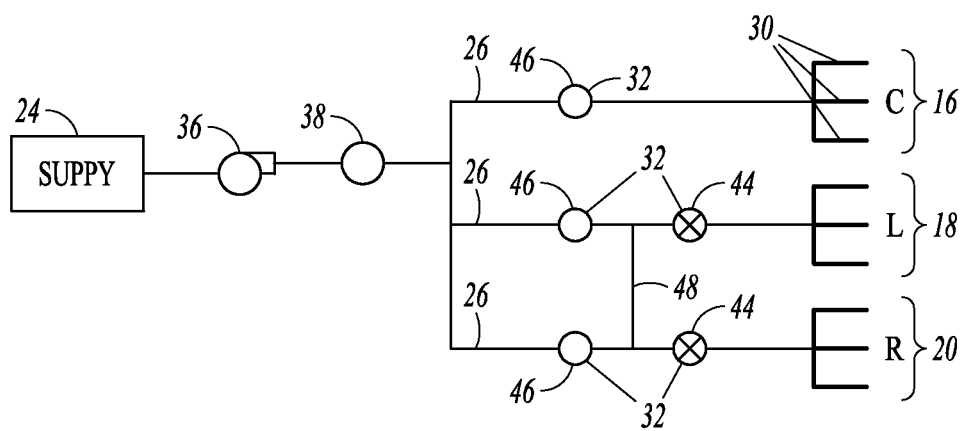

The embodiment of FIG. 4 may be arranged substantially identically to the embodiment of FIG. 5 with the exception of the metering device of the center section comprising only the restricted orifice 46 to maintain a constant metered flow rate to the center section. The remaining main lines corresponding to all of the side sections may be interconnected downstream from the restricted orifices by pressure balancing lines 48. The metering devices in this instance comprise throttling valves 44 downstream from the pressure balancing lines and the respective orifices 46 such that flow to one side section can be restricted while flow to another side section can be increased in proportion to the restriction to maintain overall flow at a constant rate as in previous embodiments while redirecting flow from one side to an opposing side of the frame.

Figure 6:
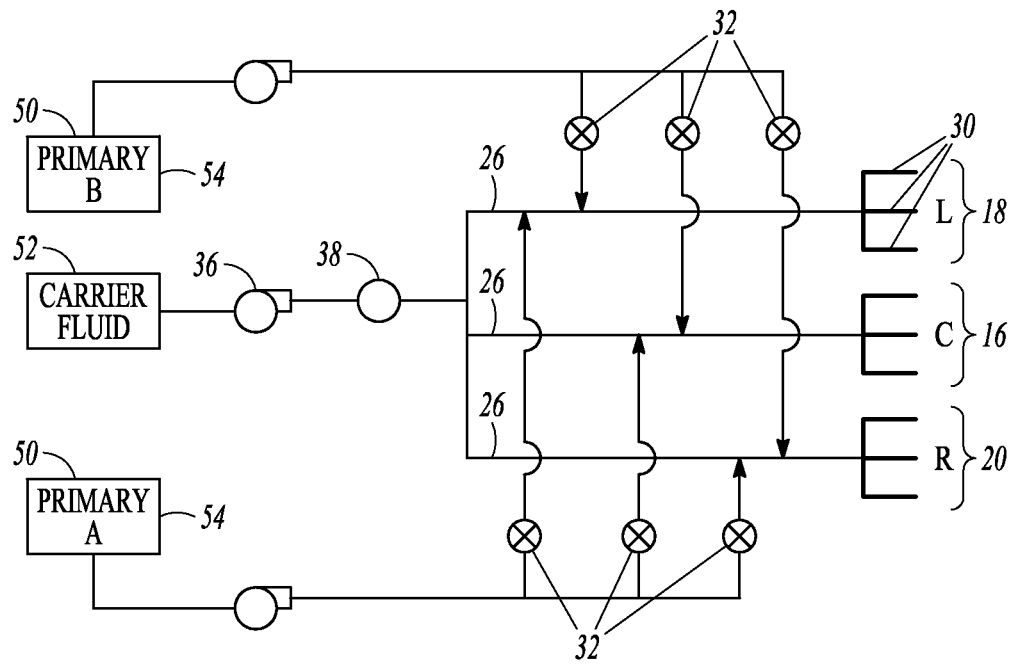
Figure 7:
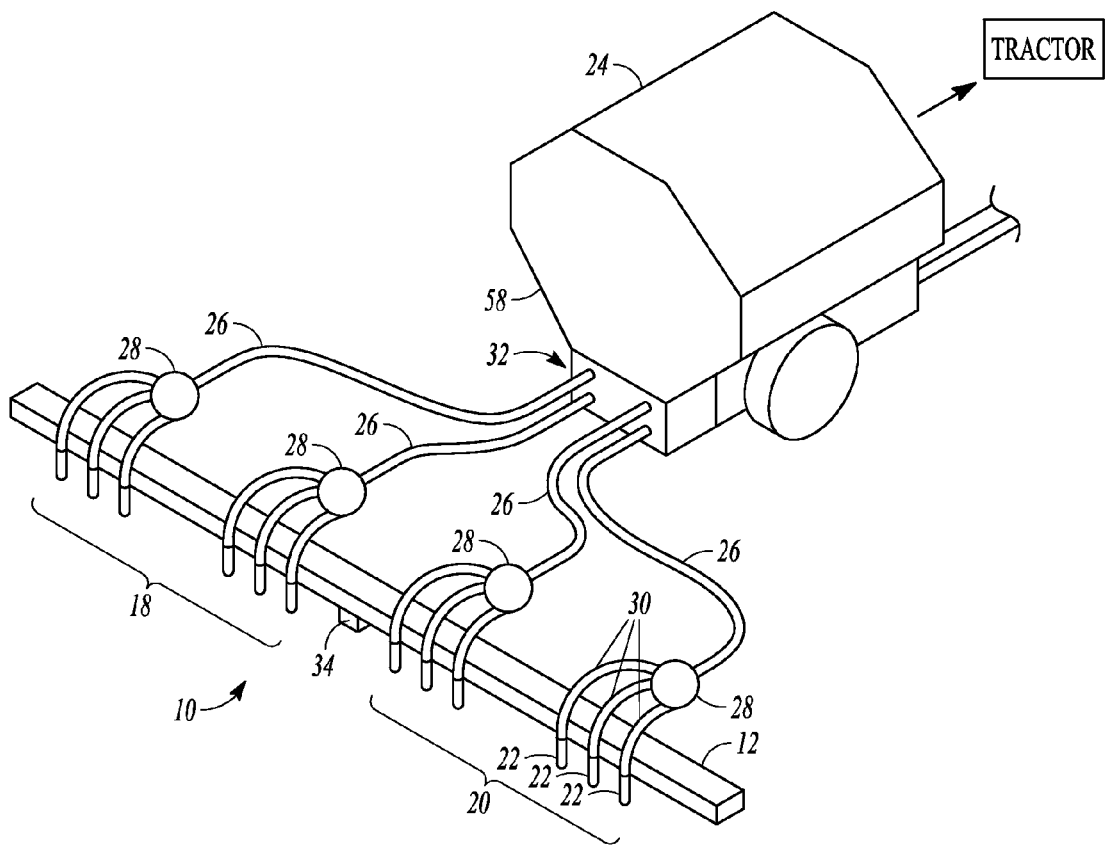
FIG. 7 is a schematic representation of one example of an agricultural air seeder to which the metering system of the present invention can be applied.

According to the embodiment of FIG. 6, a plurality of primary products 50 in the form of non diluted chemical to be applied to a field can be independently metered in concentration relative to a carrier fluid dispensed through the conveying lines. In this instance a main tank 52 of the sprayer comprises a carrier fluid supply connected by main lines 26 to the individual conveying lines 30 and subsequently the individual dispensers 22 substantially in the usual manner by supplying the carrier fluid therethrough from a primary pump 36 with an associated flow rate sensor 38.

Each primary product 50 includes its own product tank 54 which is connected to and supplies respective metering devices 32 associated with each main line of the carrier fluid and associated with each primary product. One metering device is thus associated with each primary product of each main line. Accordingly when there are two primary products as in the illustrated embodiment for communication with three main lines a total of 6 metering devices are used for metering each primary product into each main line.

Each metering device comprises a metered injector which is operable at a specified injection rate so as to be arranged to inject a metered amount of the primary product into the carrier fluid conveyed through the respective main line of a respective designated frame section independently of the other metering devices relating to other primary product or other main lines. The amount of carrier fluid remains constant in this instance but the concentration of primary products is varied so as to remain substantially constant within each center section, but can be increased or decreased in the side sections corresponding to inner or outer portions of a curved path, or all maintained at a constant concentration during normal longitudinal movement of the sprayer.

Turning now to embodiments of FIGS. 7 through 10 the implement in this instance comprises an air seeder such that the product supply comprises one or more tanks supported on a seed cart on wheels towed separately from the implement frame which comprises an air drill frame. The air drill frame includes pneumatic main lines and conveying lines for supplying particulate material to respective dispenser tubes of the dispensers. Each dispenser comprises a cultivator shovel or disc for forming a respective furrow with which the dispenser tube is aligned for depositing the metered particulate material therethrough into the furrow.

The product supplies typically include respective hopper bottoms 58 which direct the particulate material therein downwardly to respective metering wheels which define the metering devices. The metering wheels typically comprise wheels with axially oriented channels about the outer surface at circumferentially spaced positions for metering an amount of particulate material received in the channels from the tank thereabove to the pneumatic main lines below at an adjustable rate depending upon the rate of rotation of the metering devices.

Figure 8:
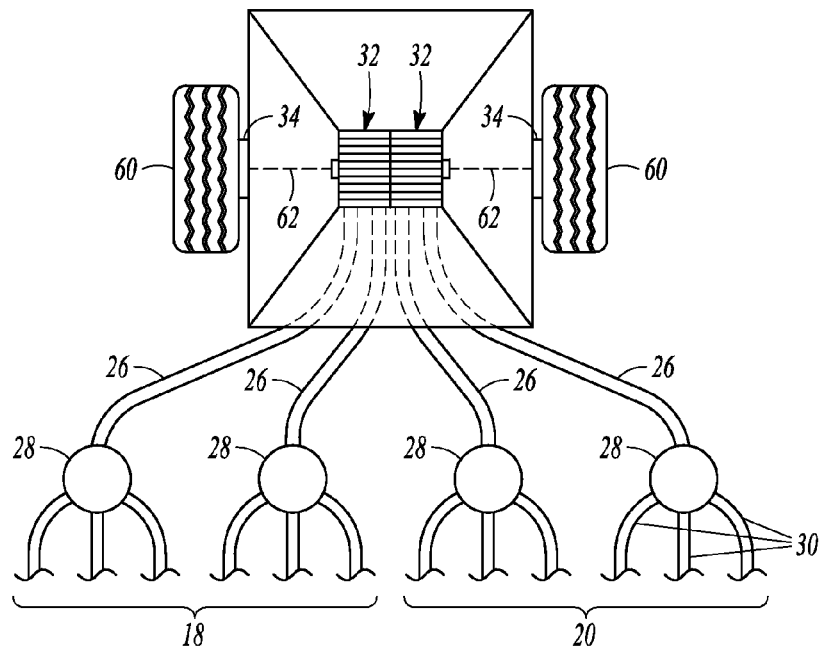
FIGS. 8 through 10 each schematically illustrate one respective embodiment of the metering system of the present invention applied to an agricultural air seeder.

Turning now particularly to the embodiment of FIG. 8, the frame in this instance is divided into only two side sections corresponding to a left section and a right section. A single metering wheel is provided within a common tank which is split into a left section wheel and a right section wheel arranged to be rotated at independent rates for independently metering product to main lines therebelow associated with the left side sections or right side sections respectively. In the embodiment of FIG. 8 the seed cart is supported on laterally spaced apart left and right wheels 60 such that each section of the metering wheel defining one of the metering devices 32 is coupled by a suitable linkage to the respective one of the two wheels 60 of the cart so that the rotation of the metering device is proportional to the respective wheel with which it is associated. When passing through a curved section one wheel will thus rotate faster than the other so that the corresponding section of the metering wheel will rotate faster resulting in more product being metered to the side of the frame with a greater forward ground speed.

Figure 9:
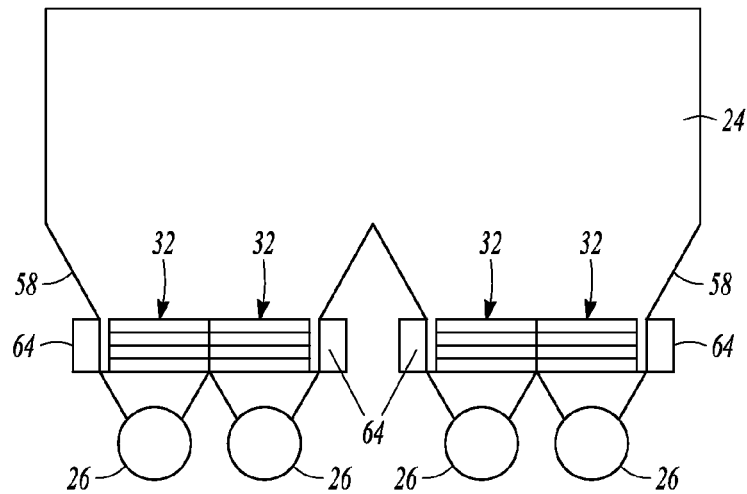

Turning now to the embodiment of FIG. 9 each separate tank on a seed cart may be designated into a greater number of individual metered sections by separating a bottom of the tank into a plurality of separate hopper bottoms which commonly communicate with a common tank area thereabove. Each separate hopper bottom 58 permits a split metering wheel to be supported therein comprising two axially abutted sections of wheel rotated about a common axis at independent rates. Each separate section of metering wheel defines a respective metering device 32 in communication with a respective main line. Each section of metering wheel is driven to rotate at its respective set rate proportional to its respective input speed determined by the computer controller by a respective control 64 which controls the rate of that section of the metering wheel which in turn controls the rate delivered to the main line and thus the rate to all of the product dispensers of the respective designated frame section associated therewith. In the illustrated embodiment two hopper bottoms of a common tank are provided with two sections of metering wheel within each hopper bottom such that four independent metering devices 32 independently meter product from a common tank to four independent main lines directed towards different sections of the frame. The different sections may include two left side sections and two right side sections, or two center sections and one left section and one right section as examples.

Figure 10:
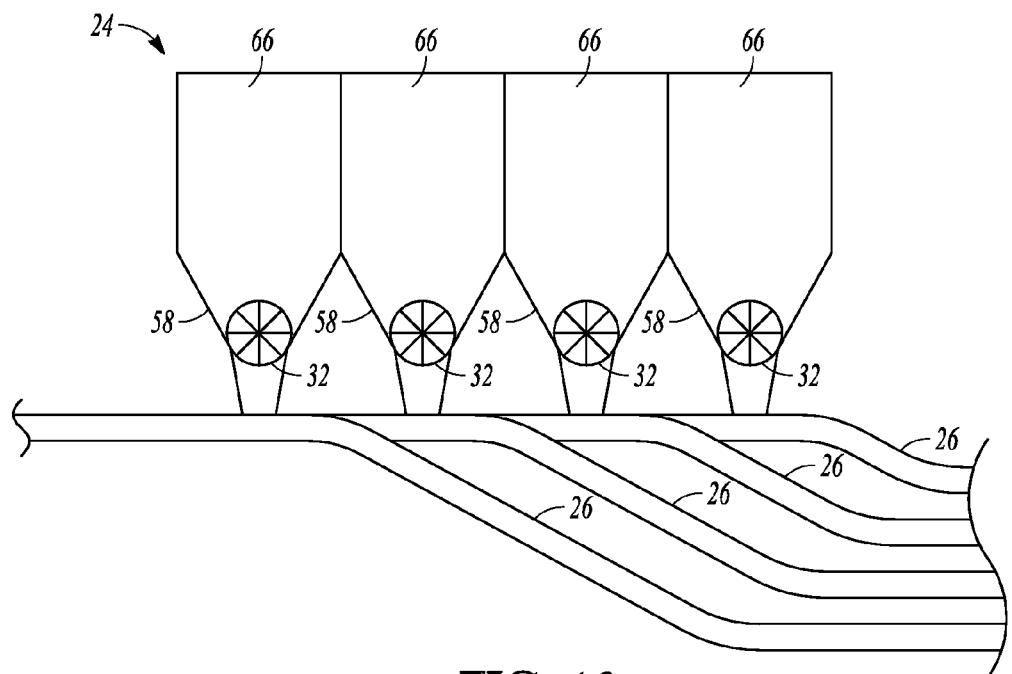

Turning now to the embodiment of FIG. 10, in further arrangements, the product supply 24 may comprise a plurality of individual tanks 66 on the seed cart in which each tank is provided with its own respective metering device 32 associated only with that tank for communication with only main lines associated with one common frame section of the implement frame. In this instance each tank is only associated with one frame section such that the metering system of that tank only meters product to the designated frame section. By operating the metering systems of the different tanks independently of one another, independent metering is again provided to different sections of the implement frame.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An implement for applying an input product to an agricultural field at variable rates between frame sections, the implement comprising:
   a frame including a plurality of designated frame sections;
   a plurality of product dispensers supported on the frame, each product dispenser of the plurality of product dispensers associated with a respective designated frame section of the plurality of designated frame sections;
   a product supply arranged to store the input product, the product supply in communication with the plurality of product dispensers;
   a plurality of conveying lines, each of the respective conveying lines of the plurality of conveying lines communicating between the product supply and respective product dispensers of the plurality of product dispensers;
   a plurality of metering pumps, each of the metering pumps in communication with the product supply and the respective conveying line of the plurality of conveying lines, and each metering pump is associated with the respective designated frame section of the plurality of designated frame sections;
   at least two metering devices located downstream of at least one metering pump of the plurality of metering pumps, each metering device in communication with a respective conveying line of the plurality of conveying lines, wherein each metering device includes an adjustable device flow rate independently adjustable from the other metering devices, the device flow rate is adjustable to dispense input product from the product supply to the respective conveying line and designated frame section at a variable rate with respect to the other metering devices; and
   each metering pump includes an adjustable set point flow rate independently adjustable from the other metering pumps, wherein each set point is adjustable to dispense input product from the product supply to the respective conveying line and respective designated frame section at a variable rate with respect to the other metering pumps.

2. The implement according to claim 1, wherein each metering pump is operable at a rate that is responsive to a respective speed input representing a speed of the respective frame section across the field in the forward working direction.

3. The implement according to claim 2, further comprising a controller arranged to receive a measured speed from at least two speed sensing locations and determine the respective speed input for each metering pump based upon the measured speeds.

4. The implement according to claim 2, further comprising a controller arranged to receive GPS data and determine the respective speed input for each metering pump based upon the GPS data.

5. The implement according to claim 1, wherein the frame comprises two designated frame sections extending outward towards respective laterally opposed ends of the frame and wherein each of the metering pumps operates at a respective rate that is proportional to speed inputs from respective ones of a pair of laterally spaced apart ground engaging wheels on the frame.

6. The implement according to claim 1, wherein the implement comprises an agricultural sprayer, the conveying lines comprise pressurized fluid lines in communication with the product supply.

7. The implement according to claim 1, wherein each metering device comprises a throttling valve that is operable independently of the other metering devices.

8. The implement according to claim 7, wherein each throttling valve is adjustable in response to a flow rate sensor in communication with the respective main line downstream from the throttling valve.

9. The implement according to claim 1, wherein each metering device comprises a pressure reducing valve operable to regulate flow rate in the respective main line at a set point flow rate.

10. The implement according to claim 9, wherein each pressure reducing valve is adjusted in response to a deviation in a measured flow rate from the set point flow rate, the deviation in the measured flow rate from the set point flow rate obtained from a flow rate sensor in communication with the respective main line downstream from the pressure reducing valve.

11. The implement according to claim 10, wherein the set point flow rate of each pressure reducing valve is adjusted by pulse width modulation.

12. The implement according to claim 1, wherein the metering device of each designated frame section includes a flow restricted orifice in series with the metering device and wherein the metering device of at least one of the designated frame sections further includes a throttling valve in series with the flow restricted orifice, the throttling valve controlled to independently adjust the flow rate to the at least one section relative to at least one other section.

13. The implement according to claim 1, wherein the designated frame sections comprise a first section and a plurality of secondary sections, wherein the metering device of each designated frame section includes a flow restricted orifice in series with the metering device, and wherein the metering device of each secondary section further includes a throttling valve in series with the flow restricted orifice, the throttling valve controlled to independently adjust the flow rate to the respective designated frame section relative to the other designated frame sections.

14. The implement according to claim 1, wherein the metering device of each designated frame section includes a throttling valve such that each throttling valve is controlled to independently adjust the flow rate to the respective designated frame section relative to the other designated frame sections.

15. The implement according to claim 1, wherein the designated frame sections comprise a first section and a plurality of secondary sections, wherein the metering device associated with the first section comprises a first metering pump operable at a first set point flow rate, the first metering pump is in communication with the product dispensers of the first section.

16. The implement according to claim 15, wherein there is further comprising at least one secondary metering pump operable at a secondary set point flow rate and in communication with the product dispensers of all of the secondary sections, the metering device associated with each secondary section comprises a throttling valve in series with the main line of the at least one respective secondary section, the throttling valve controlled to independently adjust the flow rate to the secondary section relative to at least one other secondary section.

17. A sprayer implement for applying an input product to an agricultural field at variable rates between frame sections, the implement comprising:
a frame including a plurality of designated frame sections;
a plurality of product dispensers supported on the frame in association with each designated frame section;
a carrier fluid supply arranged to store a carrier fluid, the carrier fluid supply in communication with the plurality of product dispensers;
a plurality of main lines in communication with the carrier fluid supply to receive carrier Fluid from the carrier fluid supply, each main line associated with one of the designated frame sections;
a plurality of conveying lines, each communicating a respective one of the product dispensers to one of the main lines associated with the respective designated frame section to dispense carrier fluid from the main lines to one of the respective product dispensers;
a primary product supply arranged to store a primary input product;
a plurality of metering devices, each metering device in communication with the primary product supply and a respective conveying line of the plurality of conveying lines, and each metering device is associated with a respective designated frame section of the plurality of designated frame sections;
each metering device includes an adjustable set point flow rate independently adjustable from the other metering devices, wherein each set point is adjustable to dispense input product from the primary product supply into the carrier fluid of the respective conveying line and designated frame section at a variable rate with respect to the other metering devices.

18. The implement according to claim 17, wherein each metering device comprises a throttling valve operable independently of the other metering devices.

19. The implement according to claim 17, wherein each throttling valve is adjustable in response to a flow rate sensor in communication with the respective main line downstream from the throttling valve.

20. The implement according to claim 17, wherein each metering device comprises a pressure reducing valve operable to regulate flow rate in the respective main line at a set point flow rate.

21. The implement according to claim 20, wherein each pressure reducing valve is adjusted in response to a deviation in a measured flow rate from the set point flow rate, the deviation in the measured flow rate from the set point flow rate obtained from a flow rate sensor in communication with the respective main line downstream from the pressure reducing valve.

22. The implement according to claim 20, wherein the set point flow rate of each pressure reducing valve is adjusted by pulse width modulation.

23. The sprayer implement of claim 17, wherein the metering device of each designated frame section includes a flow restricted orifice in series with the metering device, and the metering device of at least one of the designated frame sections further includes a throttling valve in series with the flow restricted orifice, the throttling valve controlled to independently adjust the flow rate of at least one section relative to at least one other section.

24. The sprayer implement of claim 17, wherein the designated frame sections comprise a first section and a plurality of secondary sections, wherein the metering device of each designated frame section includes a flow restricted orifice in series with the metering device, and wherein the metering device of the secondary sections further include a throttling valve in series with the flow restricted orifice, the throttling valve is controlled to independently adjust the flow rate to the respective designated frame section relative to the other designated frame sections.

25. The sprayer implement of claim 17, wherein the metering device of each designated frame section includes a throttling valve such that each throttling valve is controlled to independently adjust the flow rate to the respective designated frame section relative to the other designated frame sections.

26. The sprayer implement of claim 17, wherein the designated frame sections comprise a first section and a plurality of secondary sections, wherein the metering device associated with the first section comprises a first metering pump operable at a first set point flow rate, the first metering pump is in communication with the product dispensers of the first section.

27. The sprayer implement of claim 26, wherein the designated frame sections include at least one secondary metering pump operable at a secondary set point flow rate, the secondary metering pump is in communication with the product dispensers of each of the secondary sections and wherein the metering device associated with each secondary section comprises a throttling valve in series with the main line of the respective secondary section, the throttling valve controlled to independently adjust the flow rate to the respective one of the secondary sections relative to at least one other secondary section.

28. An implement for applying an input product to an agricultural field at variable rates between frame sections, the implement comprising:
   a frame including a plurality of designated frame sections;
   a plurality of product dispensers supported on the frame, each of the product dispensers of the plurality of product dispensers in association with respective designated frame sections of the plurality of designated frame sections;
   a product supply arranged to store the input product, the product supply in communication with the plurality of product dispensers;
   a plurality of conveying lines, each conveying line of the plurality of conveying lines communicating between the product supply and respective product dispensers of the plurality of product dispensers;
   a plurality of metering pumps, each of the metering pumps in communication with the product supply and a respective conveying line of the plurality of conveying, and each metering pump is associated with a respective designated frame section of the plurality of designated frame sections; and
   each metering pump includes an adjustable set point flow rate independently adjustable from the other metering pumps, wherein each set point is adjustable to dispense input product from the product supply to the respective conveying line and designated frame section at a variable rate with respect to the other metering pumps, the variable rate of each metering pump is responsive to a respective speed input representing a speed of the respective frame section.

29. The implement according to claim 28, further comprising a controller arranged to receive a measured speed from at least two speed sensing locations and determine the respective speed input for each metering pump based upon the measured speeds.

30. The implement according to claim 28, further comprising at least two metering devices located downstream of at least one metering pump of the plurality of metering pumps, each metering devices in communication with a respective conveying line of the plurality of conveying lines, wherein each metering device includes an adjustable device flow rate independently adjustable from the other metering devices, the device flow rate is adjustable to dispense input product from the product supply to the respective conveying line and designated frame section at a variable rate with respect to the other metering devices.

31. The implement according to claim 30, wherein each metering device comprises a throttling valve that is operable independently of the other metering devices.

32. The implement according to claim 31, wherein each throttling valve is adjustable in response to a flow rate sensor in communication with the respective main line downstream from the throttling valve.

33. The implement according to claim 30, wherein each meteringce comprises a pressure reducing valve operable to regulate flow rate in the respective main line at a set point flow rate.

34. The implement according to claim 33, wherein each pressure reducing valve is adjusted in response to a deviation in a measured flow rate from the set point flow rate, the deviation in the measured flow rate from the set point flow rate obtained from a flow rate sensor in communication with the respective main line downstream from the pressure reducing valve.

* * * * *